April 23, 1963  C. S. DAVIS  3,086,312
HOOK AND LURE PROTECTIVE DEVICE FOR FISHING RODS
Filed Sept. 17, 1962
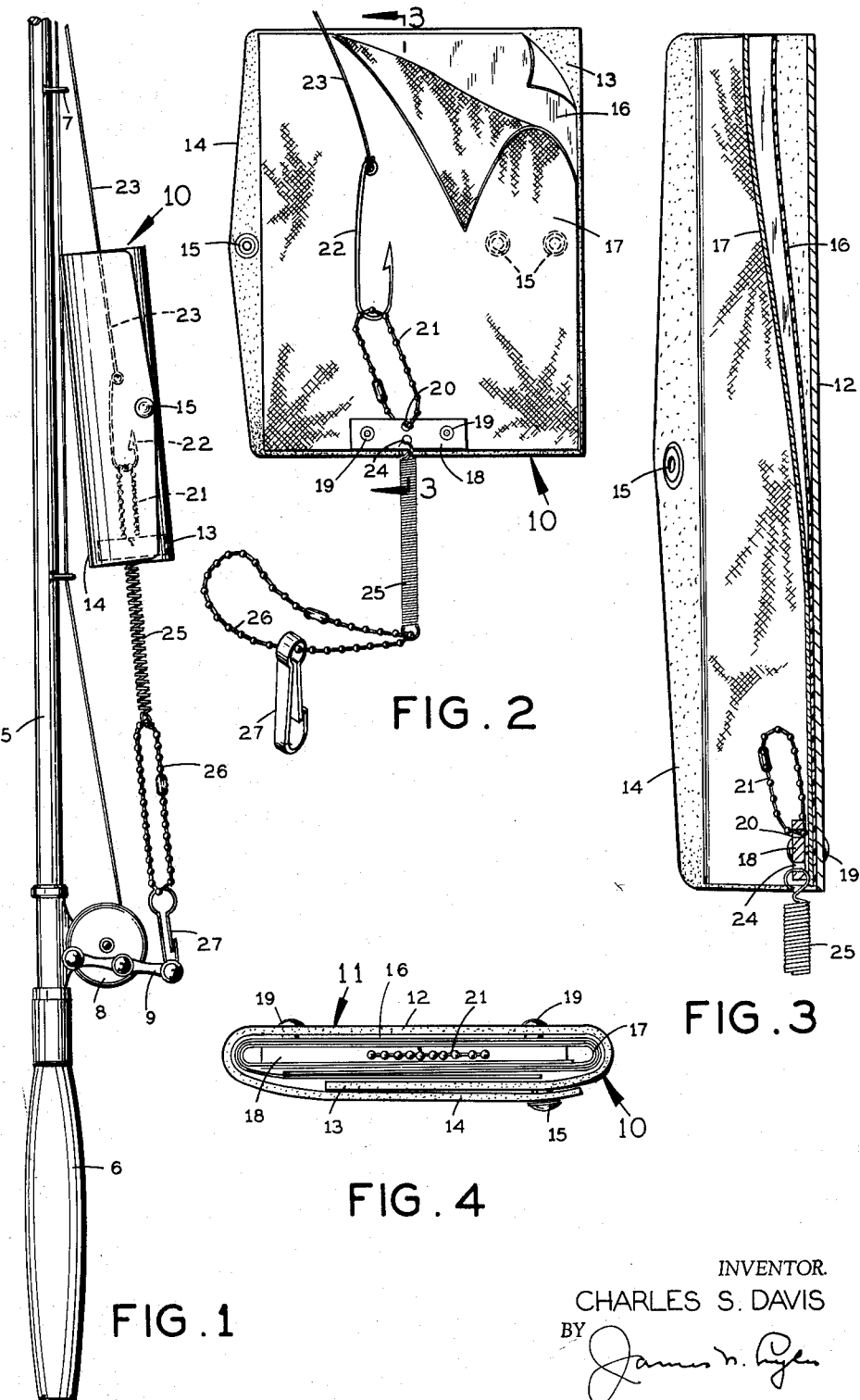
INVENTOR.
CHARLES S. DAVIS
BY
ATTORNEY

United States Patent Office 3,086,312
Patented Apr. 23, 1963

3,086,312
HOOK AND LURE PROTECTIVE DEVICE FOR FISHING RODS
Charles S. Davis, 457 NE. 24th St., Miami, Fla.
Filed Sept. 17, 1962, Ser. No. 224,117
3 Claims. (Cl. 43—25.2)

This invention relates to protective means for fishing hooks as normally retained in position upon the fishing rod.

Much difficulty has been experienced when carrying or transporting fishing rods with the fishing hooks being retained in various positions in an effort to prevent entanglement of the hooks either in the person of the user or with other fishing rods when the hook is free to swing about as is normally the situation and the device of this invention comprises a pouch of pliable material that is adapted to receive the hook, but to be folded thereover and with the hook being retained in the pouch against disengagement and with means carried by the pouch that may have snapping engagement with any desirable part of the fishing reel and then the fishing reel wound in a direction to place tension on the fishing line to prevent flapping about the fishing pole.

A further object of the invention is to provide a pouch for the anchoring reception of a fishing hook as attached to the end of a fishing line and with the pouch having a liner of relatively absorbent material that is impregnated with oil and a further protective liner that prevents the oil from passing to the pouch thus, not only anchoring the hook but also protecting the hook against rusting or corrosion.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a fragmentary side elevation of a fishing rod carrying a winding reel and showing the invention in use, FIGURE 2 is a plan view of a pouch embodied in the invention and shifted to the open position and illustrating the hook attaching means, FIGURE 3 is a fragmentary sectional view taken substantially on line 3—3 of FIGURE 2, and FIGURE 4 is a top view illustrating the pouch in the folded position.

Referring specifically to the drawings, there has been illustrated a conventional fishing rod 5, having a handle 6 and the conventional line guides 7. A conventional winding reel 8, having a winding handle 9 has been illustrated although, any conventional type of winding reels may be applicable to this invention.

Referring to the pouch, illustrated as a whole by the numeral 10, there has been provided a sheet of leather or other flexible material 11, having a base 12 and overlapping flaps 13 and 14. The flaps 13 and 14 are provided with any well known type of snap fasteners 15 so that the flaps can be overlapping, as shown in FIGURE 4. While the sheet 11 has been indicated as being of leather, it will be obvious that plastic may be employed or any type of textile material. Being substantially co-extensive with the sheet 12, there has been employed a relatively thin plastic sheet 16. Overlying the sheet 16 is an absorbent sheet 17, adapted to be saturated with oil. The sheets 16 and 17 are also co-extensive with each other.

Riveted or otherwise connected to one end of the pouch 10 and upon the inner side, is a rectangular bar 18, formed of aluminum or other non-corrosive material. The bar 18 is riveted in overlying relation to the sheets 16 and 17, by rivets 19, the rivets functioning to prevent disengagement of the sheets 16 and 17 in the use of the device. The bar 18 is substantially of a length to span the width of the base portion 12. The bar 18 is apertured at 20 for the reception of a flexible loop 21, preferably of a chain link type. The loop 21 constitutes the anchoring means for the usual fishing hook 22, carried by the fishing line 23. The bar 18 is further apertured at 24 for the reception of an end loop of a tension spring 25. The spring 25 at its opposite end is connected to a chain loop 26 and with the loop 26 being relatively longer than the loop 21. Also carried by the loop 26 is a spring snap hook 27.

In the use of the device, the pouch is opened as in FIGURE 2 and the hook 22 engaged with the loop 21, it being assumed that the sheet 17 has previously been saturated with oil. The pouch is then engaged about the hook by folding the flaps 13 and 14 and snapped into engagement with any selected snap fastener 15, encasing the hook and the snap hook 27 is then engaged with the reel 8 in any desired position and the reel rotated sufficiently to place a tension on the line 23 and pulling the pouch downwardly toward the reel. The reel is then wound sufficiently to exert adequate tension upon the spring 25, holding the pouch against swinging or wrapping about the rod 5 as the rod is carried from place to place. Where multiple hooks are employed, they may be jointly encased in the pouch 12 and the pouch then folded together with the flaps 14 and 13. The particular point at which the snap hook 27 may engage the reel may be varied but, when the line is to be tightened so as to hold the hook anchored to the loop 21, the handle 9 of the reel forms an ideal means of placing tension upon the line by the spring 25. The device may be also employed for snapping connection to any other part of the reel and in such cases, the spring 25 is first tensioned prior to the snapping of the hook 27.

It will be apparent from the foregoing that a very novel means has been employed to effectively prevent the entanglement of fishing hooks either with other fishing rods or in the person of the user. When using the device in the manner illustrated, the particular drag may be maintained upon the reel and the winding handle then controlled by the usual ratchet of the reel. The device is cheap to manufacture, is strong, durable and is quickly and easily attached to the fishing line and just as easily removed. The hooks are positively held within the pouch by the loop 21 and the hook protected against rusting when the fishing rod is stored for a considerable length of time. The loops 21 and 26 have been here illustrated as being the usual ball chain as it has considerable flexibility and are usually formed of a non-corrosive material.

It is to be understood that the invention is not limited to the precise construction shown, but that changes are contemplated as readily fall within the spirit of the invention as shall be determined by the scope of the subjoined claims.

Having described my invention what I claim as new and desire to secure by Letters Patent is:

1. A protective means for fishing hooks of the type that are carried by the terminal end of a fishing line and supported upon a fishing rod and whereby to prevent the hook from engaging other objects, the device embodying a flexible pouch having a base portion, an upper portion and a pair of overlapping flaps, the pouch upon its inner side being covered with a sheet of relatively thin plastic, an absorbent pad overlying the plastic sheet and with the pad and the sheet being co-extensive, the said pad adapted to be impregnated with oil, snap fasteners carried by the flaps whereby the flaps are held in overlapping relation to the base portion and a fish hook within the pouch, a relatively rigid bar fixed to one end of the pouch and with the bar being substantially co-extensive with the width of the base portion when the flaps are overlapped, the said bar being riveted in overlying relation to the pad and with the rivets extending through the pad, the plastic sheet and the base portion of the pouch, the bar being provided intermediate its length with a pair of apertures, a chain loop positioned within the pouch and being inserted in one of said apertures for the reception of a fish hook which is attached to a line entering the upper portion of the pouch, a coil spring having one end thereof connected to the other aperture so that the spring may extend below the pouch, a second chain loop positioned outside the pouch and being connected to the opposite end of the spring, a snap hook carried by the last named loop that is adapted to engage a part of a winding reel carried by the rod, the winding reel adapted to tension the fishing line and the pouch through the medium of the spring and whereby to prevent the pouch from swinging laterally, the first named loop functioning to prevent withdrawal of the hook from the pouch when the line and the spring are tensioned, the pouch being open at its opposite ends adjacent the base portion and the upper portion.

2. The structure according to claim 1 wherein the plastic sheet and the absorbent pad are substantially co-extensive with the pouch so that the flaps when folded over, also cause the pad and the sheet to overlap the hook.

3. The structure according to claim 1 wherein the loops are formed of ball-type chains, one flap of the pouch being provided with a pair of spaced apart male snap fasteners while the opposite flap is provided with a single female snap fastener and whereby the pouch is adjustable for a plurality of hooks.

References Cited in the file of this patent
UNITED STATES PATENTS

| | | |
|---|---|---|
| 1,269,743 | Richmond | June 18, 1918 |
| 1,979,475 | Knettles | Nov. 6, 1934 |
| 2,986,836 | Conway | June 6, 1961 |

FOREIGN PATENTS

| | | |
|---|---|---|
| 509,396 | Canada | Jan. 25, 1955 |